(12) United States Patent
Yu et al.

(10) Patent No.: US 8,065,122 B2
(45) Date of Patent: Nov. 22, 2011

(54) METHOD OF DESIGNING OR EVALUATING A BAKE OVEN

(75) Inventors: Guang Yu, Novi, MI (US); Joseph M. Klobucar, Ann Arbor, MI (US)

(73) Assignee: Durr Systems, Inc., Plymouth, MI (US)

( * ) Notice: Subject to any disclaimer, the term of this patent is extended or adjusted under 35 U.S.C. 154(b) by 467 days.

(21) Appl. No.: 12/147,084

(22) Filed: Jun. 26, 2008

(65) Prior Publication Data

US 2009/0024363 A1 Jan. 22, 2009

Related U.S. Application Data

(60) Provisional application No. 60/949,983, filed on Jul. 16, 2007.

(51) Int. Cl.
*G06G 7/48* (2006.01)
*G06G 7/56* (2006.01)
(52) U.S. Cl. .................................. 703/5; 703/6
(58) Field of Classification Search .................. None
See application file for complete search history.

(56) References Cited

U.S. PATENT DOCUMENTS

| | | | | |
|---|---|---|---|---|
| 6,394,796 | B1 * | 5/2002 | Smith | 432/229 |
| 6,490,501 | B1 * | 12/2002 | Saunders | 700/198 |
| 6,885,964 | B2 * | 4/2005 | Ogino et al. | 702/130 |
| 2005/0025902 | A1 * | 2/2005 | Kerluke et al. | 427/496 |
| 2006/0074614 | A1 * | 4/2006 | Chang et al. | 703/6 |

* cited by examiner

*Primary Examiner* — David Silver
(74) *Attorney, Agent, or Firm* — Howard & Howard Attorneys PLLC

(57) ABSTRACT

A method of designing or evaluating the design of a bake oven for curing paint on an article to achieve the cure criteria for predetermined areas of the article, including creating a three-dimensional model of the article and the bake oven, dividing the three-dimensional model into discreet elements, using a computer to set each discreet element to initial conditions and at an initial time, repeating this step to achieve substantial convergence, comparing the cure criteria with the calculated temperature as a function of time and finally modifying the computational model of the bake oven to achieve the cure criteria based upon a computer simulation.

8 Claims, 4 Drawing Sheets

METHOD OF DESIGNING OR EVALUATING A BAKE OVEN

RELATED APPLICATION

This application claims priority to U.S. Provisional Patent Application Ser. No. 60/949,983 filed Jul. 16, 2007.

FIELD OF THE INVENTION

This invention relates to a method of evaluating or designing a bake oven for curing paint on an article to achieve cure criteria for predetermined areas on the article, which includes simulating the temperature of the article during the paint bake process.

BACKGROUND OF THE INVENTION

As will be understood by those skilled in the art of painting vehicle bodies, for example, it is critical to properly cure the paint following application. The paint on large articles, such as vehicle bodies, is cured in a paint oven which typically includes several zones or stages, including multiple preheat zones, hold or bake zones and multiple cooler zones. Each of the zones typically includes upper and lower air nozzles which blow heated or cooling air on the painted bodies. The vehicle body is conveyed through the oven on a central conveyor. If the paint is not fully cured, this may compromise the paint quality, cause the paint to fall off the article and result in color issues. If the paint is over cured, the paint may become brittle or discolored. In a typical automotive application, the paint supplier provides a "cure window," which includes time and temperature. For example, an e-coat cure window may be fifteen minutes at 330° F. or higher with a maximum of 400° F. A typical paint oven may have a length of 200 to 1,000 feet and include two or more preheat zones, three or more hold zones and three or more cooling zones. As used herein, the term "paint" includes any coating, adhesive, glue or sealant which requires curing by heating. When curing paint on large objects, such as vehicle bodies, it is important to take into account the thickness of the substrate. As understood by those skilled in this art, relatively thin metal panels, such as the vehicle roof, side panels and fenders heat quickly, whereas heavier areas, such as the pillars and portions of the undercarriage heat far more slowly. Further, each vehicle body design will have different areas of concern or interest and thus it would be desirable to design a bake oven tailored to the design of the vehicle body or other article for curing paint on the article to achieve the desired cure criteria for predetermined areas of the article. The method of designing a bake oven of this invention achieves this object.

At present, a vehicle paint bake oven is designed primarily by trial and error. That is, a vehicle body is conveyed through a mock up of a paint oven and temperature sensors or probes measure the temperature of several areas of the vehicle body. Simulations of vehicle bodies and paint ovens have also been tried without success. The method of this invention simplifies the simulation and achieves the desired paint cure.

SUMMARY OF THE INVENTION

The method of evaluating or designing a bake oven for curing paint on an article of this invention achieves the desired cure criteria for predetermined areas of the article. The method of designing a bake oven of this invention includes simulating the temperature of a vehicle body during the paint bake process and may include other conditions including pressure and velocity within the paint bake oven.

The method of this invention includes creating a three-dimensional model of the article and the bake oven. In one preferred embodiment, the three-dimensional model is simplified by eliminating certain details or areas, simplifying the simulation. The method of this invention then includes creating a computational model of the article divided into discreet elements based upon the three-dimensional model. The method of this invention further includes creating a computation model of the bake oven divided into discreet elements based upon the three-dimensional model of the bake oven. A computer is then used to set each discreet element of the article and the oven to predetermined initial conditions. The method further includes calculating the actual conditions of each discreet element of the article and the oven at an initial time. In one disclosed embodiment, this step includes repeating the calculation of the initial conditions several times to reach substantial convergence.

One disclosed embodiment of determining the temperature of the discreet elements as a function of time includes calculating the convection and radiant heat flux of each discreet element of the article and using the calculated convective and radiant heat flux to calculate temperature change of each discreet element over a predetermined period of time. The steps of calculating the actual conditions of each discreet element of the article and oven and calculating the convection and radiant heat flux of each discreet element to calculate the temperature change is repeated several times to determine the temperature of each discreet element of the article as a function of time inside the oven. However, other methods may be used to determine the change of temperature as a function of time.

The method of this invention then includes comparing the cure criteria for predetermined discreet elements of the article with the calculated temperature as a function of time and evaluating the design of a bake oven based upon this criteria. Where the method of this invention is used to design a bake oven the method then includes modifying the computational model of the bake oven to achieve the cure criteria for the predetermined discreet elements of the article. As will be understood, the calculations and computations can be performed by a computer, or more preferably a plurality of computer processes may be used in parallel to perform the calculations.

As will be understood by those skilled in this art, various modifications may be made to the method of designing a bake oven of this invention within the purview of the appended claims. The following description of the preferred embodiments are for illustrative purposes only and do not limit the method of this invention except as specifically set forth in the claims.

DESCRIPTION OF THE PREFERRED EMBODIMENTS

Figure 1:
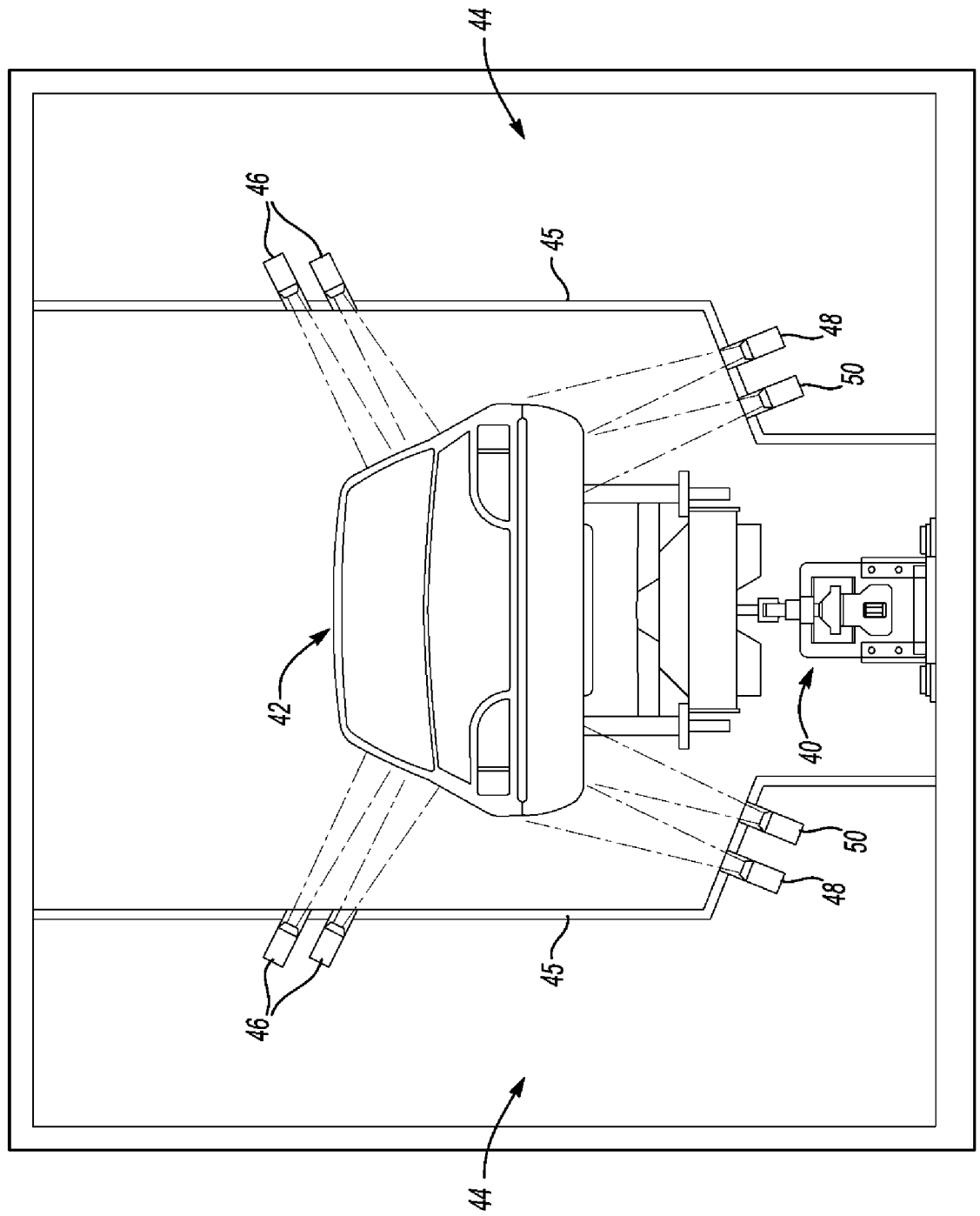
FIG. 1 is a schematic end cross-sectional view of one conventional embodiment of heat-up and preheat-up zones of a vehicle bake oven.

As set forth above, this invention relates to a method of designing a or evaluating the design of a bake oven for curing paint on an article, such as a vehicle body, to achieve cure criteria for predetermined areas of the article. The method of this invention includes simulating the temperature of the article, such as a vehicle body, during the paint bake process. As will be understood by those skilled in this art, the temperature of the vehicle body during the bake process is critical to achieving the proper bake quality. The method of this invention may be utilized in designing a bake oven for curing paint on any article and is therefore not limited to the design of a bake oven for curing paint on a vehicle body. However, curing paint on a vehicle body includes specific challenges which may be applicable to curing paint on other objects, including significant differences in the thickness of the body at various locations, a complex shape and other factors. Thus, the method of this invention will now be described principally with respect to the design of a bake oven for curing paint on a vehicle body to achieve the cure criteria for predetermined areas of the vehicle body.

As will be understood by those skilled in this art, suppliers of paint for painting vehicle bodies have specific cure criteria to achieve proper bake quality, typically including temperature and time. Thus, an object of this invention is to design a bake oven for curing paint on an article to achieve proper bake quality. Further, the term "paint," as used herein, includes any coating, including adhesive which may be used, for example, to bond components of the vehicle body together. For example, an adhesive bead is now typically included in the floor panel and the bake oven must be designed to cure the adhesive.

1. Creating a Three Dimensional Model

One preferred embodiment of the method of designing a bake oven of this invention includes creating a three-dimensional model of the article and a three-dimensional model of the bake oven. As described, the method of this invention uses a computer simulation. There are a number of commercial computer fluid dynamics (CFD) programs available on the market, including "Fluent," which is suitable for this application. As will be understood, the three-dimensional computer geometry of the vehicle body is required to perform the method of this invention. Typically, the geometry will be available from the manufacturing drawings. The geometry includes all of the important parts and the components that are in place during the paint bake process. Generally, this geometry is of all of the sheet metal components of the vehicle body, but may also include plastic parts. It may be necessary to add details, such as fillers, sealants, sound deadeners and adhesives to this geometry.

One embodiment of the method of this invention includes determining the areas of interest on the vehicle body. It is considered to be a waste of computational resources to simulate the bake process for all parts or components of the vehicle body in great detail, because some of these areas, like the structural frame, are not important to finish quality. Thus, a step in one embodiment of the method of this invention includes limiting the three-dimensional model of the vehicle body to areas of interest and eliminating areas, like the structural frame, that are not important to finish quality. As a further example, most bolts and nuts may be ignored as the bolt holes are filled. In the non-critical areas, the welded and bolted parts are merged and their thicknesses are added together. The paint layer and structural adhesives on the car body may also be ignored. It is also important to account for the actual thickness of the sheet metal of the vehicle body. As will be understood by those skilled in this art, a vehicle body is made from sheet metal of specified initial thickness. When this material is formed, typically by stamping, the metal is stretched, causing the parts to be slightly thinner than their original sheet metal thicknesses. The variation may be taken into account to enable accurate simulation of the metal temperature. This may be done by making measurements of the metal thicknesses of the actual vehicle in critical areas. Alternatively, the actual metal thickness may be estimated based upon the initial and final shape of the part. The simplest way to do this is to compare the surface area of the sheet metal blank before stamping with the finished part. The average thickness of the finished part may be assumed to be reduced by the ratio of the surface areas. A more accurate calculation is made using finite element analysis (FEA). This method simulates the deformation during forming and can provide information about the thickness of the metal at each point on the article.

The method of this invention further includes creating a three-dimensional model of the bake oven. The method of this invention may be used to design a bake oven for a particular application. However, paint bake ovens typically have fixed design parameters, including tunnel size, configuration, etc. Thus, the method of this invention may also be utilized to modify the conditions of an existing paint bake oven, including the temperature, pressure and velocity of the air blown on the vehicle in the paint bake oven to achieve the cure criteria specified by the paint supplier. Thus as used herein, the term "design" or "designing a bake oven," includes modifying the design of an existing bake oven to achieve the desired paint cure criteria. Thus, the method step of creating a three-dimensional model of a bake oven may include either designing a bake oven or using an existing bake oven to create a three-dimensional model of the bake oven.

2. Create a Computational Model

The next step in the method of designing a bake oven of this invention is to create a computational model of the article and the bake oven divided into discreet elements based upon the three-dimensional model created in the first steps. That is, the three-dimensional computer geometry of the vehicle body and the bake oven are converted into a computational mesh by dividing the three-dimensional models into three-dimensional discreet elements, commonly referred to as "meshing." As set forth above, one embodiment of the method of this invention includes simplifying the three-dimensional models, particularly of the vehicle body, by deleting selected features or parts of the vehicle body that are determined to be unimportant to the paint bake process. As a further example, a structural bumper mount at the extreme front end of the vehicle can be deleted entirely if the area of interest on the vehicle body is the door sill. Overlapping sheet metal parts may also be combined into a single thickness. Areas where overlapping sheet metal is combined into a single thickness may be tagged for special processing. Areas of interest of a vehicle body typically include the door pillar to make certain that the paint on the door pillar is cured within the cure window specified by the paint supplier. Other areas of interest include the door sill and the floor pan. As set forth above, account should also be taken of adhesive to make certain that the adhesive is also properly cured.

Figure 3:
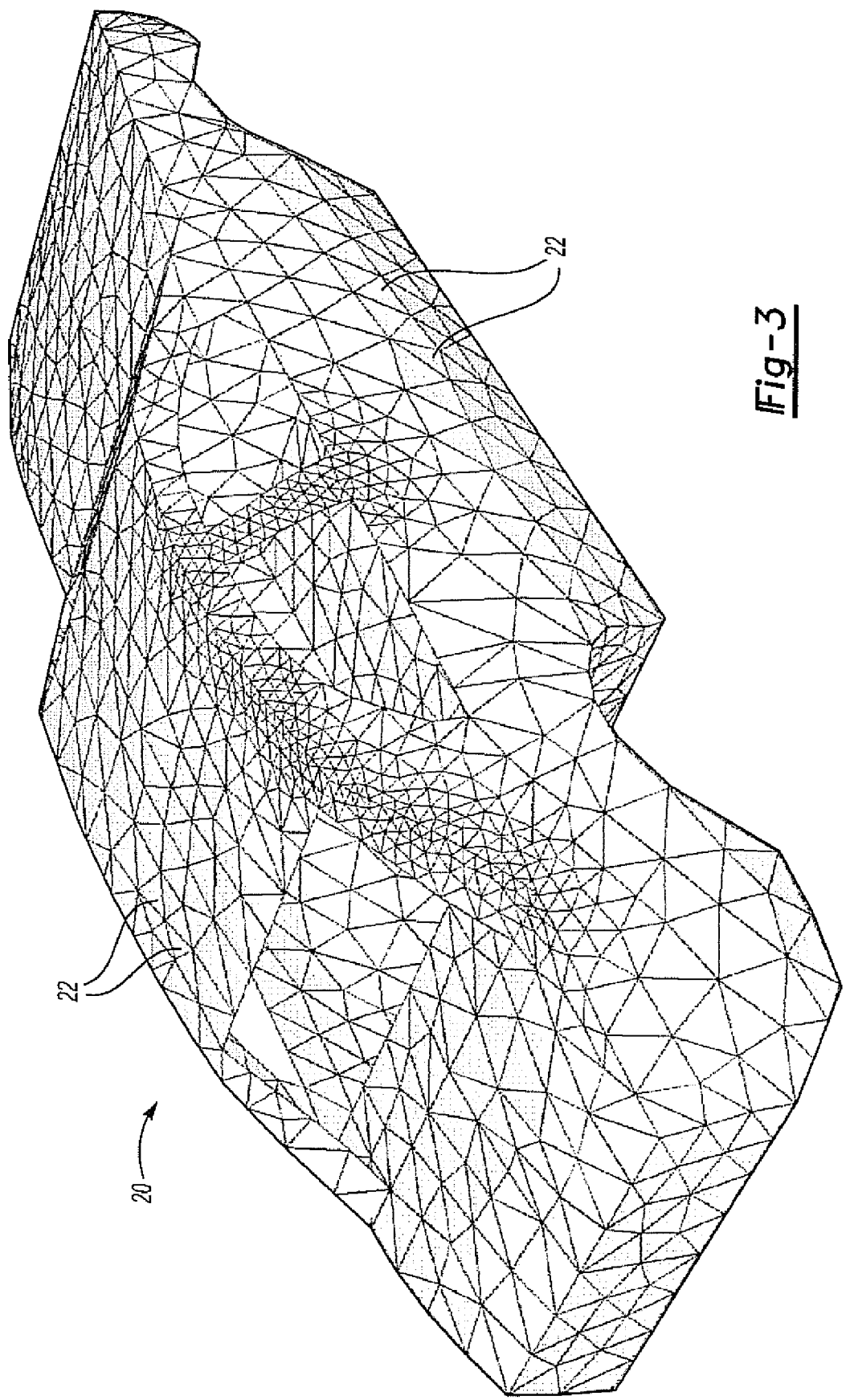
FIG. 3 is an end perspective view of one embodiment of a computational model of a vehicle body divided into discreet elements.

FIG. 3 illustrates a three-dimensional model of a vehicle body 20 which has been divided into three-dimensional discreet elements or mesh 22. In the disclosed embodiment, the mesh 22 is comprised of tetrahedrons, which are polyhedrons composed of four triangular faces, three of which meet at each vertex. A regular tetrahedron is one in which the four triangulars are regular or "equilateral" and is one of the Platonic solids. That is, a tetrahedron is one kind of a pyramid, the second most common type is a pyramid which has a flat base and triangular faces above it, but the base can be any polygonal shape, not just square or triangular. Alternatively, the mesh may be hexahedrons having six faces. The actual meshing may be accomplished using off-the-shelf meshing software. However, the meshing process should be controlled to provide a fine mesh in the areas of interest and a more course mesh in the areas that are not as important. In a typical application, the distance between the edges of the tetrahedrons may range from one inch to one foot depending upon the complexity of the article.

Figure 4:
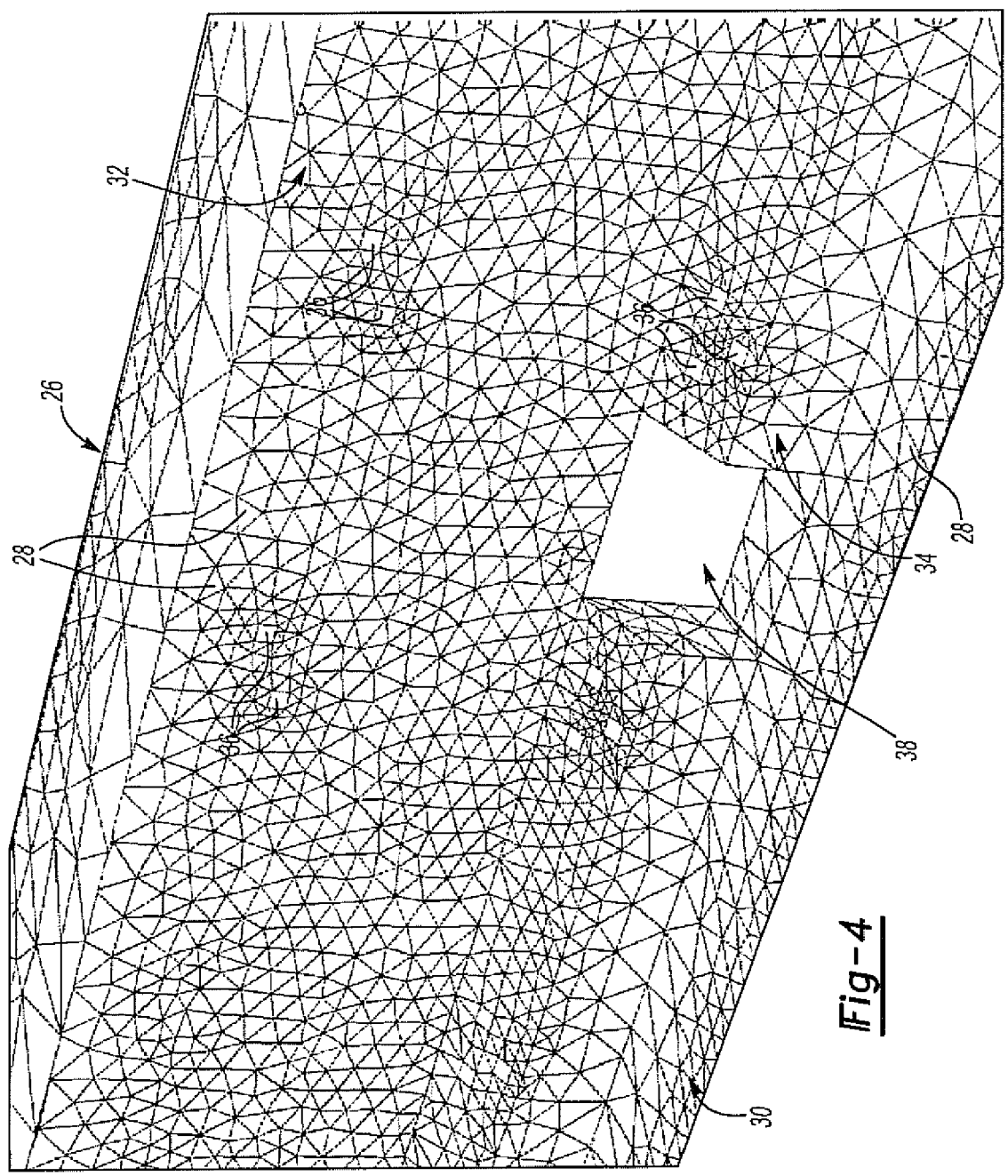
FIG. 4 is a side perspective view of a portion of a computational model of a bake oven divided into discreet elements.

The method of this invention also includes creating a computational model of the paint bake oven divided into discreet elements or mesh based upon the three dimensional model. As set forth above, the method of this invention may be used to design a bake oven for curing paint on an article starting either with a preexisting bake oven or a new design. FIG. 4 illustrates one embodiment of portions of a bake oven 26 divided into discreet elements or mesh 28, including a portion of the bottom wall, a side wall 32 and an air "plenum" 34. As shown in FIG. 4, the computational model also includes the location of the convection air supply nozzles 36 and the air return 38.

As will be understood, these discreet elements 28 comprise not just the structure of the oven, but also the volume enclosed inside the oven as the air movement and temperature in this volume is important to the simulation including in the method of designing a bake oven of this invention. It is also important for reasons discussed further below that the quality of the entire mesh of the article 20 and the bake oven 26 is controlled. One parameter useful in measuring mesh quality is Cell Equivolumne Skew (CES) which is a nondimensional parameter calculated using deviation method which is defined as:

$$(\text{Optimal Cell Volume} - \text{actual cell volume})/\text{Optimal Cell Volume}$$

wherein the optimal Cell volume is the volume of an equilateral cell (discreet elements as defined above) with the same circumradius. A value of zero indicates a best case equilateral cell and a value of one indicates a completely degenerate cell. Degenerate cells (slivers) are characterized by corners that are nearly coplanar (collinear in two dimensions). Cell equal volume skew applies only to triangular and tetrahedral elements. For the simulation to run properly, a maximum skew of any cell should be below 0.85 and is preferably below 0.82.

3. Setting the Initial Conditions

After the mesh computational model of the vehicle body and oven are created, the two meshes are merged to create a single mesh of the entire system. In baking the paint on a vehicle body, the vehicle bodies usually move through the oven during the bake on a conveyor. Because of this, a sliding mesh scheme is preferred. It has been found that this can be accomplished by dividing the system mesh into a fixed and sliding portion. The sliding portion is a tubular volume that encloses the part, but does not include any solid parts of the oven. The remainder of the bake oven and its internal volume is the fixed portion. As the simulation is executed, the sliding portion is moved incrementally through the fixed portion. This simulates the movement of an object, such as a vehicle body, through the bake oven during the bake process.

Properties for the vehicle body are set prior to starting the simulation and such properties may include metal thickness, heat capacity, emissivity and thermal conductivity. In one embodiment, before the simulation is begun, the temperature of each element of the body is set to an initial value. For example, the temperature of each discreet element of the vehicle body may be set to 80° F. The vehicle body may have a uniform initial value or the initial value may be non-uniform. Boundary conditions are specified for the convection air volume and temperature as well as radiant wall temperatures. Other oven walls are given boundary conditions, specifying the heat flux or temperature.

4. Calculating the Actual Conditions

Once the computational models are complete, the next step is to calculate the initial air temperatures and velocities within the oven. This is done by running the commercial computer fluid dynamics (CFD) simulation in a steady state mode with the vehicle body either removed from the domain or held at the initial temperature. This CFD method includes sequentially calculating the conditions of each discreet element based on the conditions of adjacent elements and repeating the calculations until substantial convergence is achieved.

5. Temperature as a Function of Time

Once the actual conditions of each discreet element of the article and bake oven are determined at an initial time, the next step of the method of designing a bake oven of this invention includes repeating the step of calculating the actual conditions of each discreet element of the article and the bake oven a plurality of times to determine the temperature of each discreet element of the article as a function of time inside the oven. This can be accomplished by the CFD method described above or a variety of other methods. In one embodiment, the method of determining the temperature of each discreet element of the article as a function of time includes calculating the convection and radiant heat flux of each discreet element of the article and using the calculated convection and radiant heat flux to calculate the temperature change of each discreet element over a predetermined period of time. In any case, the calculation of the temperature of the article as a function of time is done by calculating the conditions at discrete time steps. The duration of the time step may range for example from 0.1 to 2 seconds, preferably about 1 second.

In areas where multiple thicknesses of sheet metal or components are combined into a single thickness during the simplification process described above, the internal heat resistance of the junction between the metal sheets simulated using a "user defined function" (UDF). The UDF accounts for the thermal resistance of the junction between the two sheets and will calculate a temperature for each of the layers. The UDF takes into account the thickness of the various layers as well as the magnitude of the thermal resistance between the layers. The thermal resistance depends upon how close together the overlapping sheets are and what type of fastening system is used between the sheets, such as spot welds, adhesive, fasteners, etc.

6. Comparing the Cure Criteria

The next step in the method of this invention is to compare the cure criteria for predetermined discreet elements of the article with the calculated temperature as a function of time. The results are then evaluated to determine if the discreet elements of the vehicle body are achieving the bake criteria, particularly in the critical areas. If deficiencies are discovered, the bake oven, vehicle body or boundary conditions are modified to rectify the situation. Thus, this method may thus be used to evaluate the design of a bake oven.

7. Achieving the Paint Cure Criteria

Where the method of this invention is used to design a bake oven, the final step in the method of this invention includes modifying the computational model of the bake oven to achieve the cure criteria for the predetermined discreet elements or areas of the article. This can be accomplished by modifying the conditions within the bake oven including adjusting the temperature or velocity of the air blown on the article in the bake oven or adjusting the location or direction of the air blower nozzles in the bake oven. Alternatively, the design of the bake oven including the dimension of the oven.

As will be understood by those skilled in this art, a paint bake oven generally comprises a "tunnel-shaped" oven through which the article is conveyed typically on a central conveyor. The bake oven for a vehicle body generally includes several zones, including one or a plurality of pre-heat zones, one or a plurality of heat-up zones, one or a plurality of hold zones and one or a plurality of cooling zones. The paint oven may further include one or a plurality of pre-hold zones.

FIG. 1 is a schematic end cross-section of heat-up and preheat-up zones of a conventional vehicle paint oven having a central or axial conveyor 40 which conveys a vehicle body 42 through the paint oven. In a typical application, the paint oven includes air plenums 44 on opposed sides of the conveyor 40 separated from the vehicle body by partitions 45. As will be understood by those skilled in this art, heated or cooling air is blown into the plenums 44 depending on the zone. In this embodiment, the partitions include a plurality of upper level convection air nozzles 46 which blow hot air in this embodiment onto the upper portion of the vehicle body 42, lower level nozzles 48 which blow hot air onto the lower portion of the vehicle body and underbody nozzles 50 which blow hot air onto the underbody of the vehicle.

Figure 2:
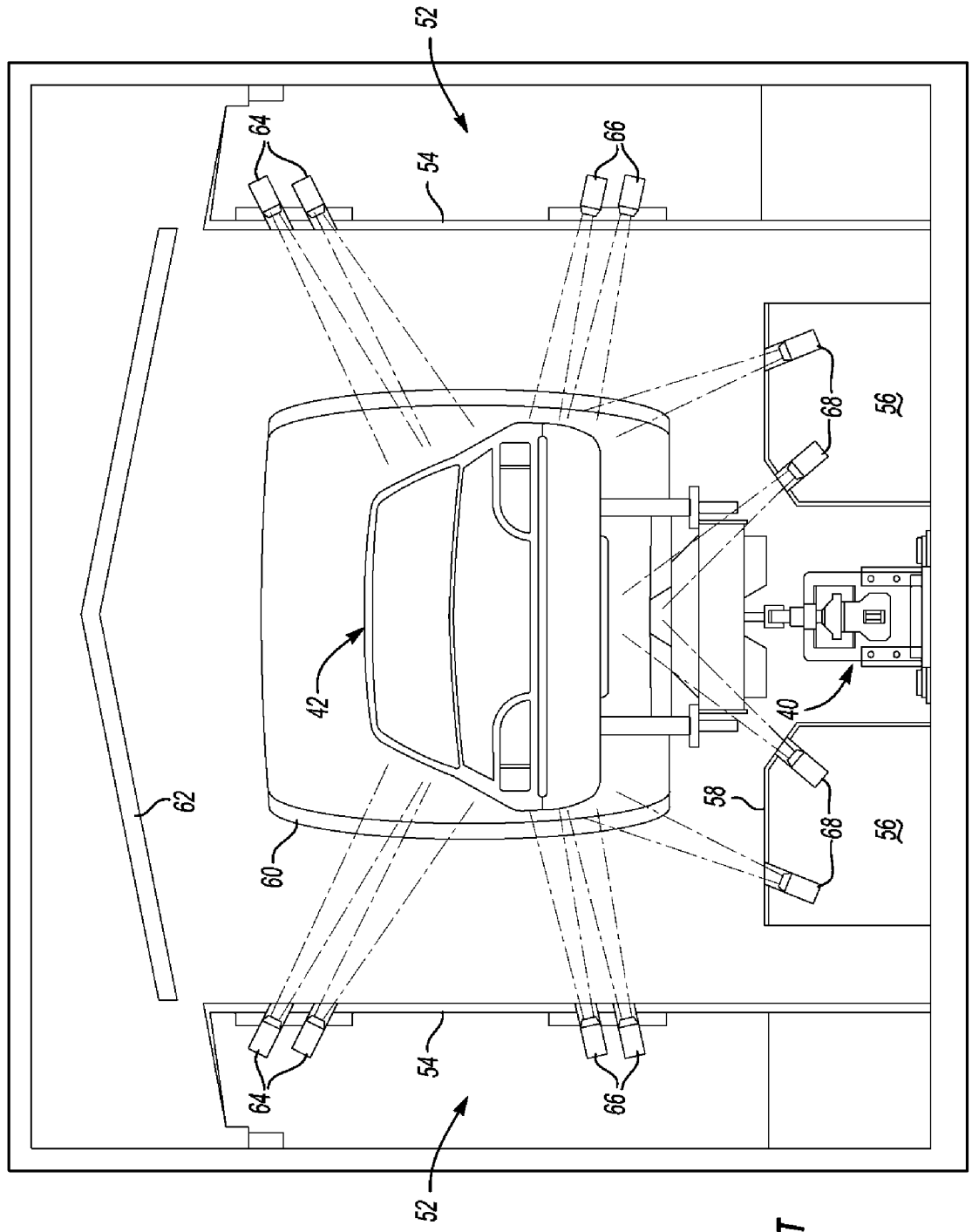
FIG. 2 is a schematic end cross-section of one embodiment of a conventional cooler zone of a vehicle bake oven.

FIG. 2 is a schematic cross-section of a cooler zone of a conventional vehicle paint bake oven. In this embodiment, the cooler zone includes side plenums 52 separated from the vehicle body 42 by partitions 54 and lower air plenums 56 separated from the vehicle body 42 by partitions 58. In this embodiment, the cooler zone also includes side baffles 60 and an upper baffle 62. The cooler zone illustrated in FIG. 2 includes upper level nozzles 64, lower level air nozzles 66 and underbody nozzles 68. As will be understood by those skilled in this art, the hold or heat zone may only include lower level nozzles as shown at 48 in FIG. 1 and underbody nozzles as shown at 50 in FIG. 1.

As will be understood by those skilled in this art, in a conventional vehicle body paint oven, hot or cold air is blown into the plenums under pressure (44 in FIG. 1 and 52 and 56 in FIG. 2) under pressure and the heated or cooled air is then blown onto the vehicle body 42 by air nozzles (46, 48 and 50 in FIG. 1, and 64, 66 and 68 in FIG. 2). The air nozzles may be adjusted to blow air in any direction onto the vehicle body 42 and the location of the air nozzles may also be moved on the partitions to blow hot or cold air directly on any portion of the vehicle body 42. Further, the pressure in the air plenums may be increased or decreased to increase or decrease the velocity of the air blown through the nozzles and the velocity of the vehicle body through the bake oven may also be increased or decreased to increase or decrease the dwell time of the vehicle body in the various zones.

Thus, the method of this invention includes modifying the computational model of the bake oven to achieve the cure criteria for the predetermined discreet elements of the vehicle body by adjusting the conditions for example by adjusting the location or direction of the air blower nozzles in the bake oven or adjusting the temperature or velocity of the air blown onto the article or adjusting the velocity of the conveyor based upon the method of this invention. Alternatively, the size or configuration of the paint bake oven may also be modified by moving the partitions defining the air plenums toward or away from the vehicle body or increasing or decreasing the size of the bake oven.

Having described the preferred embodiments of the method of evaluating or designing a bake oven of this invention, it will be understood by those skilled in this art that various modifications may be made to the method of this invention within the purview of the appended claims. For example, the basic design of the bake oven will depend upon the article and the type of paint cured in the bake oven. Further, the number of zones of the bake oven will also be dependent upon the article and the cure requirements of the paint. As set forth above, the term "paint" includes any coating or adhesive. Having described the preferred embodiments of the method of this invention, the invention is now claimed as follows.

The invention claimed is:

1. A method of designing a bake oven for curing paint on an article conveyed through the oven on a conveyor to achieve cure criteria for predetermined areas on the article, comprising the following steps:

creating a three dimensional computer simulated model of the article;

creating a three dimensional computer simulated model of a bake oven;

creating a computational computer simulated model of the article divided into discreet three-dimensional elements based upon the three dimensional computer simulated model of the article;

creating a computational computer simulated model of the bake oven divided into discreet three-dimensional elements based upon the three dimensional model of the bake oven;

using a computer to set each discreet element of the article and the bake oven to initial conditions;

using a computer to simulate the actual conditions of each discreet element of the article and bake oven at an initial time;

using a computer to repeat the previous step a plurality of times to simulate the temperature of each discreet element of the article in time increments as the simulated article moves inside the oven;

comparing the cure criteria for predetermined discreet elements of the article with the calculated temperature in time increments;

modifying the computational model of the bake oven to achieve the cure criteria for predetermined areas of the article; and designing a bake oven based upon the computer simulations.

2. The method as defined in claim 1, wherein the step of using the computer to simulate the actual conditions is repeated to reach substantial convergence.

3. The method as defined in claim 1, wherein the three dimensional computer simulated model of the article is simplified by eliminating certain detail or areas.

4. The method as defined in claim 1, wherein the conditions are temperature, pressure and velocity of the conveyor.

5. The method as defined in claim 1, wherein the bake oven includes air nozzles and the method includes adjusting the location or direction of air blower nozzles in the bake oven to achieve the cure criteria.

6. The method as defined in claim 5 wherein the method includes adjusting the temperature or velocity of air blown on the article in the bake oven to achieve the cure criteria.

7. The method as defined in claim 1, wherein the step of calculating the actual conditions of each discreet element of the article and bake oven includes calculating the convection and radiant heat flux of each discreet element of the article and using the calculated convection and radiant heat flux to calculate temperature change of each discreet element over a predetermined period of time.

8. The method as defined in claim 1, wherein the step of repeating the prior step a plurality of times includes using a computer to simulate advance of the article relative to the bake oven a predetermined distance, then calculating the temperature change of each discreet element relative to an adjacent element and repeating the step of the claim until substantial convergence is reached.

* * * * *